United States Patent

[11] 3,554,254

| [72] | Inventor | Fritz Knecht<br>Am Schlachthof 798 Ravensburg,<br>Germany |
|---|---|---|
| [21] | Appl. No. | 756,253 |
| [22] | Filed | Aug. 29, 1968 |
| [45] | Patented | Jan. 12, 1971 |
| [32] | Priority | Sept. 2, 1967 |
| [33] | | Germany |
| [31] | | No. 1,632,111 |

[54] KNIFE BLADE FOR MACHINES PRODUCING SAUSAGE FILLING MATERIAL
3 Claims, 6 Drawing Figs.

[52] U.S. Cl. .................................................. 146/106, 146/67, 146/129
[51] Int. Cl. ........................................................ B02c 18/06
[50] Field of Search............................................ 146/67, 106, 129, 182, 192, 189.1

[56] References Cited
UNITED STATES PATENTS
3,221,788  12/1965  Hughes.......................  146/182
FOREIGN PATENTS
322,398  12/1929  Great Britain................  146/129

*Primary Examiner*—Willie G. Abercrombie
*Attorney*—Ernest G. Montague

ABSTRACT: A knife blade having countersinks on its surface, in particular for machines for production of sausage filling, in which the countersinks are designed such that a closed, nontoothed cutting edge remains.

Inventor:
Fritz Knecht
By: Ernest G. Montague
Attorney

PATENTED JAN 12 1971

Inventor:
Fritz Knecht
By: Ernest G. Montague
Attorney.

KNIFE BLADE FOR MACHINES PRODUCING SAUSAGE FILLING MATERIAL

The present invention relates to a knife blade for machines producing sausage filling, in general, and to such knife blade, the surface of which is equipped with a countersink, in particular.

If such knife blades are to be practically usable, they have to fulfill simultaneously several conditions during the working of the sausage mass. The edge must be designed such that, in addition to a fact size reduction effect, the created heat can be held at certain limits, whereby in the interest of a good inner binding of the goods to be cut, the airing effect is of great importance. Furthermore, a so-called friction effect should be present, which brings about an emulsification and intensive admixing of the different meat types. Finally, the knife must be designed such that possibly no swinging breaks of the knife are to be encountered.

A known cutting knife, designed in accordance with these views, fulfills the mentioned requirements, more or less well, however, has the basic drawback, that the groovelike countersinks are disposed within the range of the chamfer grind, so that during the aftergrinding also the grooves and the toothed cutting edge, respectively, must always be ground again, which can only be performed on a special machine.

Corresponding tests and conclusions have brought about the finding, that the toothing of the cutting edge caused by the ground grooves can be eliminated, and the arrangement and design of the countersinks, respectively, is of primary importance for the compliance with the above-stated conditions.

It is, therefore, one object of the present invention to provide a knife blade for machines producing sausage filling, wherein the knife blade is equipped with countersinks, which are designed such that a closed nontoothed cutting edge remains on the knife.

By this arrangement it is assured, that by the countersinks the above-stated requirements are complied with to a high degree, without necessity of taking in stride the known drawbacks of a toothed cutting edge. These drawbacks are shown in particular there, where a sausage mass worked with a toothed cutting edge results in a rough cutting face of the sausage, while the arrangement of the knife blade according to the present invention assures the desired smooth cutting face.

The principle of the present invention can be realized by different means, whereby, in the first place, the shape of the countersinks and their arrangement is of essence.

It is another object of the present invention to provide a knife blade for machines producing sausage filling, wherein in groovelike extending countersinks the toothing of the cutting edge by grinding is avoided, except for a narrow chamfer reaching to the groove base. By this arrangement, with each grinding the grooves become somewhat shorter, they are, however, up to the last grind conditioned by the knife width, still long enough, in order to perform their special functions, thus, heat- and air-removal, friction and emulsion of the goods, as well as a swinging damping.

In order to make possible a possibly great number of aftergrindings and to obtain possibly long countersinks, respectively, in accordance with the present invention, the countersinks are provided on the chamfer side of the knife.

A particularly strong friction and cooling effect is obtainable in accordance with the present invention such, that the countersinks cross each other so that camlike part faces are formed on the knife face.

Depending upon the character of the goods to be worked and the size of the knife, the width and depth of the countersinks are chosen. In this direction, the present invention provides the use of wide faced radial countersinks extending under circumstances up to the cutting edge, the base faces of which run plane, so that radial camlike projections are created and no teething is formed in the cutting edge. Here, it is thus worked with comparatively few countersinks, the total volume of which suffices, however, in order to bring about the desired effects. The aftergrinding of the cutting edge is here possible without consideration of the countersinks, thus in a very simple manner.

With these and other objects in view which will become apparent in the following detailed description, the present invention, which is disclosed by example only, will be clearly understood in connection with the accompanying drawings, in which.

Figure 1:
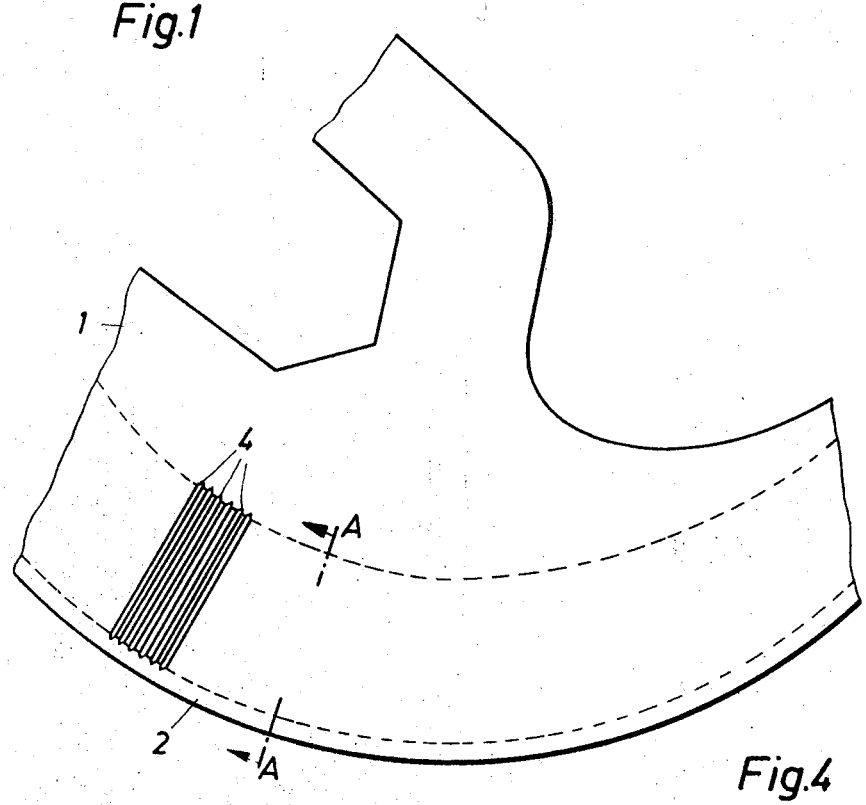
FIG. 1 is a top plan view of a knife blade.
Figure 2:
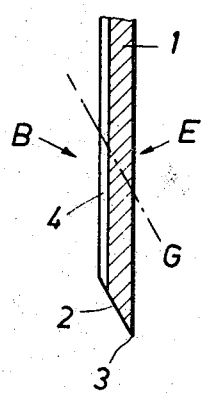
FIG. 2 is a section along the lines 2—2 of FIG. 1, shown at an enlarged scale.
Figure 3:
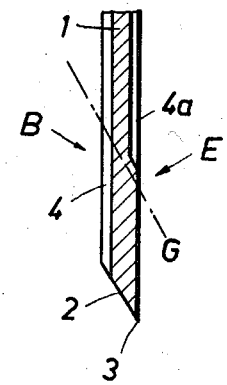
FIG. 3 is another embodiment of the knife blade shown with a radial section, at an enlarged scale.

Referring now to the drawings, and in particular to FIGS. 1 and 2, the knife blade 1 has on the chamfer-side B the chamfer 2 obliquely outwardly arranged and forms with the other knife side E the cutting edge 3. Outside the chamfer 2 and above the latter, respectively, are arranged the groovelike sinks 4, which in the embodiment disclosed in FIG. 3 are arranged on both sides 4 and 4a.

As can be ascertained from FIGS. 1 and 2, the grooves 4 can be formed as long, that, in spite of the shortenings occurring by the grinding, they are still effective. The grooves disposed in the embodiment in FIG. 3 on the other knife side E are limited as to their length by the inner limit G of the aftergrinding range. Here, also, it is obtained, as on the chamfer side B that the cutting edge 3 remains untoothed and that during aftergrinding, the grooves and a toothed cutting edge, respectively, do not have to be likewise afterground.

Figure 4:
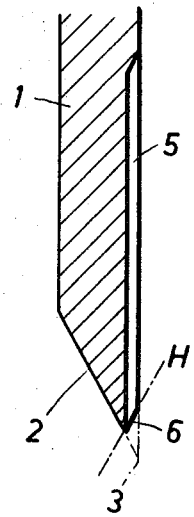
FIG. 4 is a further embodiment of the knife blade in a radial section, at a strongly enlarged scale.

In the embodiment disclosed in FIG. 4, the groovelike countersink 5 is provided on the other knife side and is extended originally up to the cutting edge margin 3. The teeth, which are created thereby, are removed by a grind guided in the plane H. Upon further aftergrinding of the small chamfer 6, also the chamfer 2 must be afterground on the chamfer side.

The described effects are also obtainable with a knife having a ball-shaped countersink.

Figure 5:
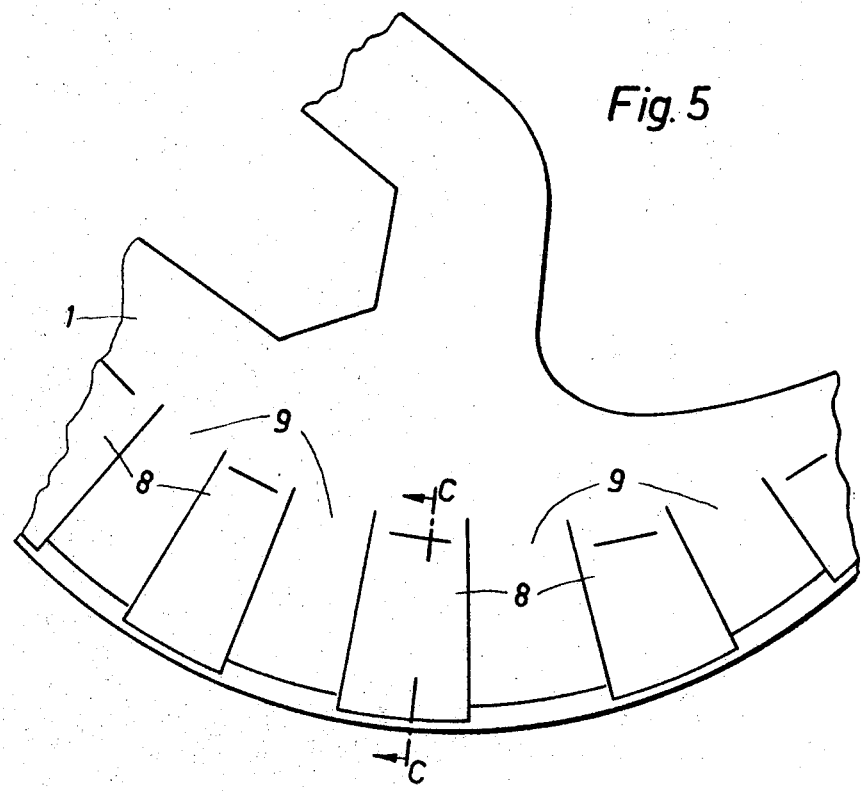
FIG. 5 is a knife blade with wide countersinks.
Figure 6:
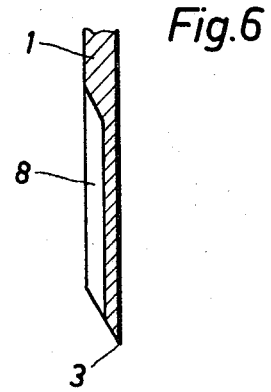
FIG. 6 is a section along the lines 6—6 of FIG. 5.

FIGS. 5 and 6 disclose an embodiment, in which the knife 1 is equipped with wide countersinks 8, which can be disposed at equal or different distances and with equal or differently wide intermediate faces 9, respectively. The faces 9 form thereby flat cams, which during the admixing and emulsioning, respectively, of the goods contribute while the air removal and the heat exchange takes place substantially by means of the countersinks 8.

The cutting edge 3 is not interrupted by the countersinks 8 and can be ground or afterground throughout, respectively, within the range of the cams and the countersinks.

I claim:

1. A knife blade having countersinks on its surface, in particular for machines for production of sausage filling, wherein: said knife blade includes a cutting edge, and said countersinks are designed such that said cutting edge is closed, nontoothed and has an equal cross section over its entire length.

2. The knife blade, as set forth in claim 1, wherein:
said knife blade defines a groove side on the side having said countersinks; and
said countersinks have a chamfer extending on the said groove side to an edge of said groove.

3. The knife blade, as set forth in claim 1, wherein:
said cutting edge includes a chamfer on one side of said knife blade, and
said countersinks are disposed on said one side of said knife blade.